(12) United States Patent
O'Neil et al.

(10) Patent No.: US 8,107,957 B1
(45) Date of Patent: Jan. 31, 2012

(54) SEAMLESS ENTERPRISE AND CONSUMER MOBILITY WITH MULTIPLE NUMBERS

(75) Inventors: Douglas R. O'Neil, Marietta, GA (US); John Alson Hicks, III, Roswell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 909 days.

(21) Appl. No.: 11/559,363

(22) Filed: Nov. 13, 2006

(51) Int. Cl.
*H04W 36/00* (2009.01)

(52) U.S. Cl. ......... 455/436; 455/445; 455/416; 370/352

(58) Field of Classification Search .................. 455/436, 455/439, 432, 406, 445, 557; 370/331, 329, 370/401, 400, 338; 709/224; 235/379
See application file for complete search history.

(56) References Cited

U.S. PATENT DOCUMENTS

| | | | | |
|---|---|---|---|---|
| 5,926,755 | A * | 7/1999 | Ghisler ......................... | 455/509 |
| 6,233,465 | B1 | 5/2001 | Smith et al. | |
| 6,957,077 | B2 | 10/2005 | Dehlin | |
| 2002/0178163 | A1 | 11/2002 | Mayer | |
| 2003/0114158 | A1 | 6/2003 | Soderbacka et al. | |
| 2004/0196810 | A1 * | 10/2004 | Kil et al. ......................... | 370/331 |
| 2005/0021713 | A1 * | 1/2005 | Dugan et al. ................... | 709/223 |
| 2005/0037745 | A1 * | 2/2005 | Chan et al. ..................... | 455/416 |
| 2005/0079816 | A1 * | 4/2005 | Karabinis et al. ............. | 455/12.1 |
| 2005/0120198 | A1 | 6/2005 | Bajko et al. | |
| 2005/0239498 | A1 * | 10/2005 | Dorenbosch et al. ......... | 455/552.1 |
| 2006/0052110 | A1 * | 3/2006 | Xu et al. ......................... | 455/445 |
| 2006/0079236 | A1 | 4/2006 | Del Pino et al. | |
| 2006/0111112 | A1 * | 5/2006 | Maveddat ...................... | 455/439 |
| 2006/0116127 | A1 * | 6/2006 | Wilhoite et al. ............... | 455/442 |
| 2006/0159047 | A1 | 7/2006 | Olvera-Hernandez et al. | |
| 2006/0166699 | A1 | 7/2006 | Aghvami et al. | |
| 2006/0258356 | A1 | 11/2006 | Maxwell et al. | |
| 2007/0037578 | A1 * | 2/2007 | Besterman ...................... | 455/445 |
| 2007/0121584 | A1 * | 5/2007 | Qiu et al. ........................ | 370/352 |

OTHER PUBLICATIONS

Office Action dated Oct. 21, 2008 as issued in U.S. Appl. No. 11/275,783.
Notice of Allowance dated Apr. 7, 2009 as issued in U.S. Appl. No. 11/275,783.

* cited by examiner

*Primary Examiner* — Nick Corsaro
*Assistant Examiner* — Mahendra Patel
(74) *Attorney, Agent, or Firm* — Parks IP Law LLC; Mickki D. Murray, Esq.

(57) ABSTRACT

Tools and techniques for seamless enterprise and consumer mobility with multiple numbers are described. The techniques provide simultaneous ringing on a mobile communication device and manage network connections between the mobile communication device and at least two networks. The simultaneous rings are to at least one of a primary number associated with a mobile communication device and one or more identified numbers associated with the primary number. The simultaneous rings are based on a presence and/or physical location of the mobile communication device. The multiple numbers may have associated distinctive ring functions or tones. When the mobile communication device is proximate to the first network, a first detection signal is generated. A first presence signal indicates whether the condition of the connection permits an ongoing communication on the first network. The communication is handed over to a second network when the connection does not permit continuing on the first network.

19 Claims, 7 Drawing Sheets

SEAMLESS ENTERPRISE AND CONSUMER MOBILITY WITH MULTIPLE NUMBERS

CROSS-REFERENCE TO RELATED APPLICATION

The instant application is related to commonly assigned co-pending U.S. patent application Ser. No. 11/457,541, entitled "Seamless Enterprise and Consumer Mobility", by Douglas O'Neil and John Alson Hicks III; incorporated by reference for all that it teaches and discloses.

TECHNICAL FIELD

The subject matter relates generally to seamless enterprise and consumer mobility, and more specifically, to methods for providing access to multiple numbers on a mobile communication device across various networks.

BACKGROUND

Traditionally, nearly every household and business employed a landline telephone system as a form of communication. However, wireless communication has grown in popularity, such that approximately seventy percent of the households in the United States own a mobile communication device, while some households no longer employ a landline phone. Usage of mobile communication devices has also grown in businesses, but landline telephone systems are still commonly employed in office environments because of lower operating costs than wireless. Thus, business enterprises may assign landline telephone numbers to employees in office environments.

Owning a mobile communication device as the only form of communication poses several unique problems. One problem relates to network operating efficiency in different physical environments. For example, electromagnetic signals may be unable to penetrate fully through the walls of buildings. If users of mobile communication devices bring their devices inside such buildings, their devices may be unable to operate, and the quality of their services may deteriorate or terminate altogether. As a result, users are inconvenienced when working at remote office locations, clients' offices, or other types of buildings.

Another problem of owning a mobile communication device as the only form of communication is the difficulty in distinguishing calls that are business related from personal calls. If users bring their mobile communication devices to the office, personal and other non-business related calls may be received during business hours, causing disruption in a business environment. On the other hand, if users rely on mobile communication devices for business purposes, the devices may receive personal calls, as well as business calls throughout the day.

With the business environment changing to a more mobile one, employees may work from various locations without commuting to an office. Unfortunately, this may be problematic when clients may wish to contact employees by phone, especially during urgent situations. When an employee is not able to personally answer the landline phone system in the office, the calls may be sent to a voice mail system. Thus, an employee may dial the voice mail system to check for messages left on the office phone number. A need arises for the communication device to serve both business related and personal calls across various networks. Accordingly, various exemplary methods and systems described below are directed towards these problems.

SUMMARY

Methods for providing seamless enterprise and consumer mobility are described. Methods disclosed herein manage network connections between a mobile communication device associated with multiple numbers and at least two or more networks. When the mobile communication device is proximate to a first network, a first detection signal is generated. Also, a first presence signal is associated with the first network, and varies in response to a condition of a connection between the communication device and the first network. The first presence signal indicates whether the condition of the connection permits an ongoing communication on the first network. These methods provide simultaneous rings to a primary number associated with the mobile communication device and to one or more identified numbers associated with one or more second communication devices across two or more networks. Simultaneous rings are sent to the mobile communication device and/or to the second communication device(s) associated with the multiple numbers, when a call or a message is directed to the primary number or to the one or more identified numbers. Furthermore, the simultaneous rings to the primary number include distinctive ring functions, tones, audible notifications, or visual indications. When the condition of the connection does not permit the ongoing communication to continue on the first network, the ongoing communication is handed over to a second network.

The methods forward calls or messages directed to one or more identified numbers associated with the second communication device to the primary number of the mobile communication device on at least two or more networks. The forwarding calls or messages may include a video, an instant message, an email, a text message, a multimedia, or a voice mail message.

Other systems, methods, and/or computer program products according to embodiments will be or become apparent to one with skill in the art upon review of the following drawings and detailed description. It is intended that all such additional systems, methods, and/or computer program products be included within the scope of this description and the accompanying claims.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Various exemplary operating environments, systems, and related methods provide for seamless enterprise and consumer mobility across two or more networks. These exemplary operating environments, systems, and methods enable a mobile communication device to interact with a variety of network modules to access telecommunication services using multiple numbers associated with the mobile communication device.

Figure 1:
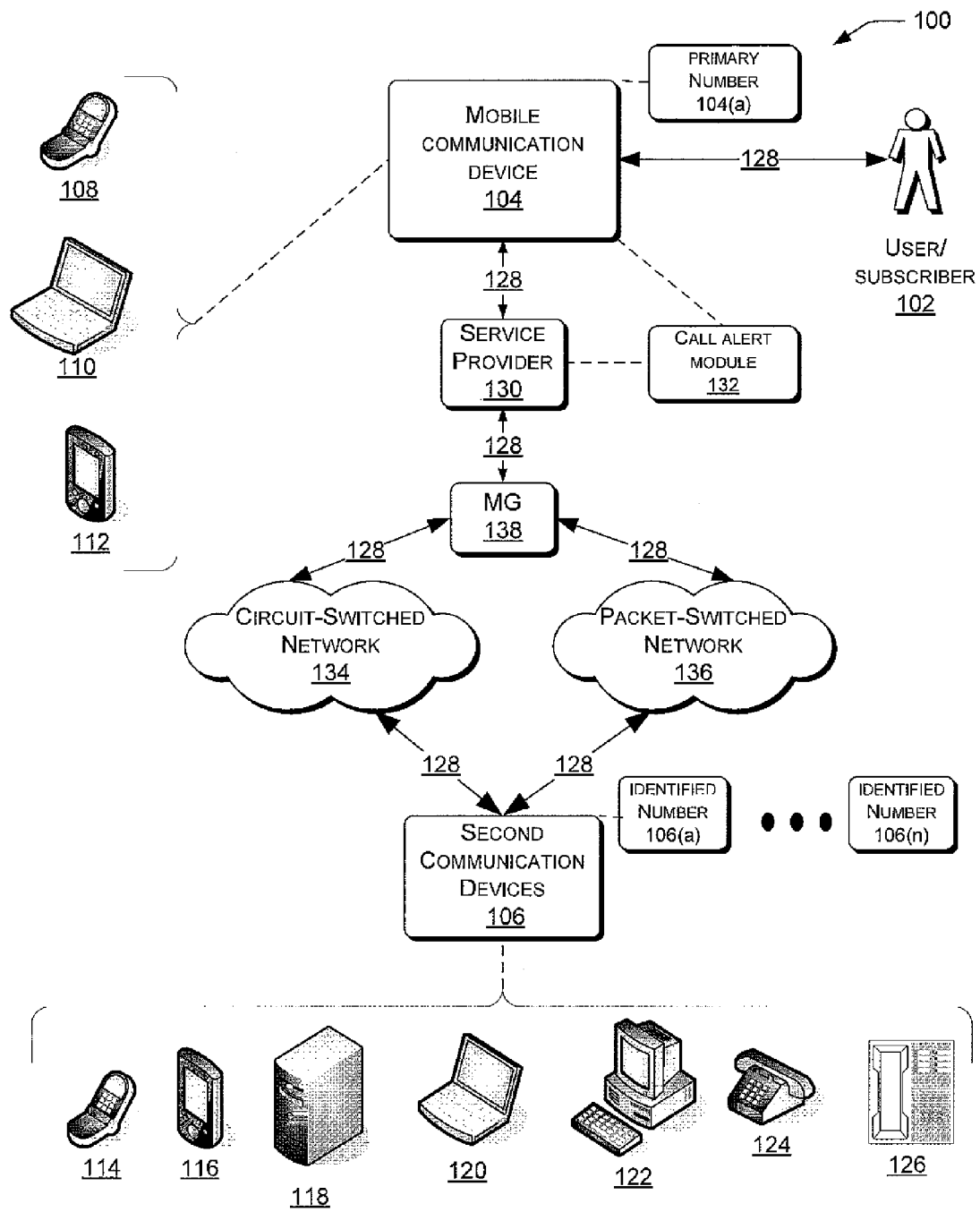
FIG. 1 is a block diagram of an exemplary operating environment for providing seamless enterprise and consumer mobility.

FIG. 1 illustrates an exemplary operating environment 100 for providing seamless enterprise and consumer mobility. Terms "user" 102, "subscriber", and "consumer" may be used interchangeably to describe a person or an entity using the mobile communication device 104 and/or a person or an entity subscribing to a consumer telecommunication services. Other terms are also used interchangeably with user and subscriber, such as "customer" or "account holder".

As shown in FIG. 1, the mobile communication device 104 may include a mobile telephone 108, a laptop computer 110, a wireless-enabled personal digital assistant (PDA) 112, or other similar mobile devices and associated with multiple numbers. The term "numbers" may include phone numbers, network addresses, email addresses, and the like. For example, one of these multiple numbers may be a primary number 104(*a*) directly related to the mobile communication device. Multiple numbers associated with the primary numbers may be directly related to a second communication device(s) 106. This direct relationship may indicate that a number is directly associated to a device. For example, the second communication devices may have direct relationships with one or, more identified numbers 106(*a*) . . . 106(*n*). The one or more identified numbers are associated with the mobile communication device through an identified list associated with the user's subscription account. These numbers are not shown in any particular order, but are shown for illustrative purposes only.

The methods provide simultaneous rings to the mobile communication device 104 and to the second communication device(s) 106 across various networks both wired and wireless. The term "simultaneous rings" may include audible indications of communications that are directed at approximately the same time to the mobile communication device 104 and to the second communication device(s) 106. The term "approximately" indicates that the rings may arrive at the two devices at different times, owing to device capabilities, network conditions, geographical factors affecting the different devices, and the like. The term "communication" may describe calls or messages, including video, voice, multimedia, email, text, and data. In embodiments, these simultaneous rings are provided to one or more multiple numbers 104(*a*), 106(*a*) . . . 106(*n*), which, in turn, are assigned to two or more different communication devices.

For example, the mobile communication device and the second communication device(s) may receive simultaneous rings when a call or a message is directed to the mobile communication device. In another example, the mobile communication device and the second communication device(s) may receive simultaneous rings when the call or message is directed to the second communication device(s). In another example, the mobile device may receive simultaneous rings when the call or message is directed to the second communication device while the second communication may not receive simultaneous rings for calls or messages directed to the mobile communication device.

By way of illustration, an identified number may include a business enterprise, such as a landline phone number assigned to a telephone located at the business but associated with a cellular phone. Thus, a call or a message directed to the landline phone number will simultaneously ring at the business enterprise and on the mobile communication device. For exemplary purposes, the mobile communication device 104 shown in FIG. 1 may be associated with only two numbers or a plurality of numbers.

In addition, the primary number 104(*a*) and the one or more identified numbers 106(*a*) . . . 106(*n*) may have distinctive ring functions, tones, audible notifications, auditory announcements or visual indications to distinguish which number may have been called. These distinctive ring functions and/or tones may also indicate a message is in voice mail or a call is incoming, while the user is on the mobile communication device. By way of illustration, the primary number 104(*a*) associated with the mobile communication device may play musical ring tones that are rather lively with a variety of notes, songs, or types of music to indicate the calls or messages are personal and non-business related. In another example, the identified number 106(*a*) related to the business enterprise may have an audible ringing tone that resembles an office phone ring to identify calls or messages that are business related. Another option is that the ring functions and tones may identify a caller, if a unique ring tone is assigned to or associated with the caller or with the number of the caller. These ring functions and/or tones may be available from the service provider, purchased through a website, downloaded for free, or accessible from a server. Another option is that the identity of a caller may be communicate in the playing of a auditory message or voice tag, such as "Call from John Smith".

In one illustration, the user 102 utilizes a mobile communication device 104 to receive communication directed to one or more identified numbers in direct relationship with the second communication device 106. Methods provide forwarding calls or messages directed to the one or more identified numbers to the primary number. The calls may be forwarded based on the time of day, day of the week, the identity of the caller or type of call. Furthermore, the forwarded calls may include may include distinctive ring functions, tones, audible notifications, or visual indications to distinguish between a call directed to the primary number from calls directed to the one or more identified numbers.

As shown in FIG. 1, the second communication device 106 may include several forms, including but not limited to a mobile handset 114 and/or a wireless PDA 116. A second user may use these second communication devices to converse with the user 102. In other embodiments, the second communication devices may receive communications that are simultaneously ringing on the second communication devices and on the mobile communication device. In other examples, communications directed to the second communication devices may be forwarded to the mobile communication device 104.

The second communication device may also include one or more servers 118 that may provide voice mail, electronic mail, or other services at least to the user 102. Furthermore, the one or more servers may provide calling features such as direct calling, call forwarding, call waiting, distinctive ring functions, tones, or other type of calling features and services.

The second communication device 106 may include a laptop computer 120 or a desktop computer 122, which may be associated with the user 102 or with other individuals. These devices may be wireless or wired. For example, the user may access the server, the laptop computer, or the desktop computer to access his or her voice mails or e-mails while away from the home or office. By way of illustration, the user may access his or her own computer remotely, without being in or near the office. Additionally, the user may access the laptop computer or desktop computer in order to reach the person using the laptop computer or desktop computer. Furthermore, the mobile communication device may receive simultaneous rings and call forwarding based on communication directed to these second communication devices.

The second communication device 106 may include a landline phone 124 located at a house, an apartment, a business, or a landline business phone 126 located in a business enterprise or a shared network. For example, communication directed to the identified number 106(a) may ring simultaneously on the landline phone and the mobile communication device.

As shown in FIG. 1, the user 102 with the mobile communication device 104 and the person and/or the second communication device 106 may exchange text, voice, data, multimedia, as represented generally by the lines 128. The exchange of communication flow 128 may be either unidirectional or bidirectional in nature.

In an exemplary embodiment, a person or the user with the second communication device 106 may utilize services and equipment located on premises at a location of the second communication device. In another possible implementation, the person or the user of the second communication device 106 may utilize services and equipment located on the premises of an entity that provides telecommunication services to the second communication device 106, in an outsourcing arrangement.

The user 102 may subscribe to telecommunications services offered by a service provider 130. These telecommunications services may include features such as abbreviated dialing to members of a specified user group, call forwarding, call waiting, three-way conferencing, or other types of calling features. The forwarding of communication occurs upon subscribing and notifying the provider of telecommunication services. The subscriber has identified numbers on a call list for forwarding communication or for providing simultaneous rings.

The service provider 130 may provide the mobile communication device 104, which may include a "call alert feature". The "call alert feature" may be implemented as one or more call alert modules 132, which may include software instructions suitable for execution on host hardware. The call alert module 132 may cooperate with at least one of a screen, a touchpad, a key, a button (hard or soft), a switch, a toggle, a light, or the like that alerts the user 102 whether incoming calls or messages are dialed to the primary or the one or more identified number and the identity or the number of the caller.

The user 102 may provide instructions to the service provider 130 that may include forwarding calls immediately upon activation of the call alert feature, routing calls based on a physical location, routing calls based on a day and/or a time period, or the like. Depending on the logic of call routing parameters, the calls to the primary number may be routed to the mobile device according to rules or conditions specified or defined by the user. However, in different implementations, the device may or may not include the call alert feature. Using this feature, the user 102 may be reached during urgent situations. In addition, this feature may enable the user 102 to speak directly with the callers, instead of routing to a voice mail system. The same touchpad, screen, key, button, switch, toggle or light may be used to turn off or deactivate the 'call alert feature'.

In an exemplary embodiment, the user 102 may receive business communication directed to the identified number 106(a), and the communication may "simultaneously ring" on the mobile device 104 and the second communication device 106. Using the call alert feature, the user may specify the times and days when the calls are routed, by sending appropriate instructions to the service provider. The user may also specify any distinctive ring functions or tones with which incoming calls are announced. The user may establish the priority order of calls, such as a call rings first on the business landline phone 124, 126 before ringing on the mobile communication device 104. The priority order of calls occurs within a few seconds and is considered "simultaneous". In another example, the priority order of calls may establish ringing first on the mobile communication device, the business landline second, and a home phone third. The user may also determine when to receive simultaneous rings on the mobile device. Upon activation of the call alert feature, the rings and/or calls may be routed immediately, if selected for immediate delivery. Thus, the user may receive business rings and/or calls directly without being in the office or having to access voice mail.

In another exemplary embodiment, the call alert feature may alert the user to the identify of the caller and/or the number of the caller. The call alert feature may be linked to a database, a business enterprise, an address book, and the like to associate the identification or the number of the caller. By identifying the caller or number of the caller, the call alert feature may provide more than one return message to the caller, depending on whether the call is business related, personal, or non-business. Thus, the user may set up the caller identification information, the type of message to be delivered if not available, and the like.

The service provider 130 may enable the mobile communication device 104 to access a circuit-switched network 134 and/or a packet-switched network 136 and enable the user to "roam" while using networks provided and maintained by other service providers. The service provider may include a media gateway (MG) 138 that provides interoperability between the circuit-switched network 134 and the packet-switched network 136. The media gateway 138 converts packet-switched voice/data traffic to circuit switched voice/data traffic, and vice versa. Thus, the MG 138 may provide cross-application user interface for phone, instant messaging, video and file exchange communications. Alternatively, a media gateway control function (not shown) may perform similar functions to the MG 138.

The mobile communication device 104 is described as a "multi-mode" handset to indicate that the mobile device may operate with a plurality of different types of communications networks. For example, the handset 104 may communicate with both the circuit-switched networks 134 and the packet-switched networks 136. The mobile device may cooperate with the components and modules described below to handover an ongoing call between these two different types of networks, i.e., the circuit-switched networks 134 and the packet-switched networks 136. The exemplary environment 100 integrates features and functions that allow for seamless enterprise and consumer mobility for accessing telecommunication services to multiple phone numbers across the various networks.

Figure 2:
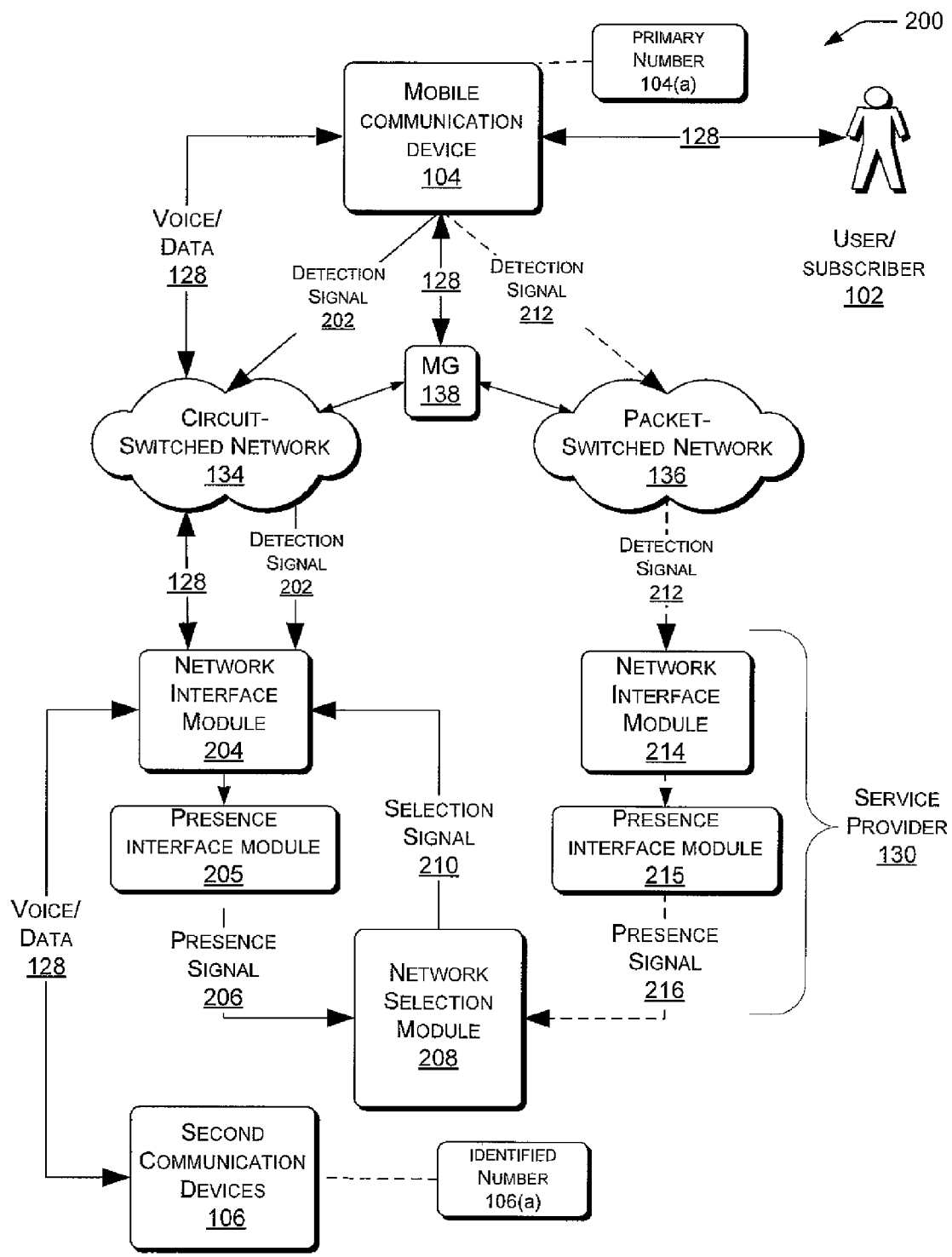
FIG. 2 is a block diagram of an operating environment in which a mobile communication device receives communications from a second communication device over a network.

FIG. 2 illustrates an operating environment 200 in which the user 102 with the mobile communication device 104 communicates with or receives simultaneous rings or forwarded calls from the second communication device 106 using the circuit switched network 134 to receive communication. The communication flow 128 may be either unidirectional or bidirectional in nature. In FIG. 2, the mobile communication device 104 is initially within range of, and able to communicate using, the circuit-switched network 134. Accordingly, the circuit-switched network may detect the mobile communication device when the mobile communication device is in proximity to the circuit-switched network, as represented generally by a device detection signal 202

A network interface module 204 may receive the device detection signal 202. The network interface module converts the communication signals 128 as appropriate for transmission between the circuit-switched network 134 and the second communication device 106. Other networks may be located intermediate to the circuit-switched network 134 and the second communication device 106. Thus, the network interface module may convert the signals 128 as appropriate for transmission to and/or from any such intermediate networks. In other instances, the network interface module may convert the signals as appropriate for transmission to and/or from the second communication device 106. Assuming that the circuit-switched network may take a variety of different types, the network interface module may be compatible with these different types. Alternatively, a different network interface module may be provided for each of these different forms or types. The network interface module 204 may also analyze the condition of the device detection signal 202 to determine the strength and/or quality of the connection with the mobile communication device.

A presence interface module 205 may generate a presence signal 206 that may vary in response to the strength and/or quality of the device detection signal 202. For example, if the mobile communication device 104 is relatively close to a cellular transmission tower, or other infrastructure associated with the circuit-switched network, then the presence interface module 205 may generate a presence signal having a first value that indicates that the connection to the user is strong. However, if the user with the mobile communication device 104 moves farther away from the cellular tower, or moves to a physical environment that impedes signals associated with the circuit-switched network, then the presence interface module may generate a presence signal indicating that the connection to the mobile communication device is weak. If connection between the mobile communication device and the circuit-switched network is lost altogether, the presence signal may assume a null value.

A network selection module 208 may receive and analyze the presence signal 206. More specifically, the network selection module may determine whether the strength and/or quality of the connection with the mobile communication device is sufficient to permit continued communications with the user via the circuit-switched network. The network selection module may, for example, establish and/or apply one or more thresholds to determine whether communications via the circuit-switched network are possible.

If the presence signal 206 satisfies the above thresholds, then the network selection module 208 may assert a selection signal 210. The selection signal 210 activates the network interface module 204 so that the voice/data 128 passes between the user and the second communication device via the circuit-switched network 134. For convenience only, FIG. 2 shows the voice/data 128 passing through the network interface module. However, it is noted that in different implementations, the voice/data 128 may or may not pass through the network interface module.

For illustrative purposes, FIG. 2 shows the mobile communication device 104 connected to the packet-switched network 136. A device detection signal 212 in dashed lines indicates that the mobile communication device is not proximate to the packet-switched network, but how the mobile communication device would communicate through the packet-switched network. The packet-switched network 136 would operate in a similar manner to the circuit-switched network. For example, the device detection signal 212 may indicate when the mobile communication device is proximate to the packet-switched network 136.

The service provider may also provide a network interface module 214 that is associated with the packet-switched network 136. The network interface module 214 may function similarly to the network interface module 204, receiving and analyzing the device detection signal 212. The presence interface module 215 may function similarly to the presence interface module 205, producing a presence signal 216 that indicates a strength and/or quality of any connection between the user and the packet-switched network.

The network interface modules 204 and 214, the presence interface modules 205 and 215, and the network selection module 208 may be implemented as software in any appropriate computing or scripting language. As such, the network interface modules, the presence interface modules, and the network selection module may be stored in computer-readable media and loaded for execution by a general-purpose, computer-based processing system.

Figure 3:
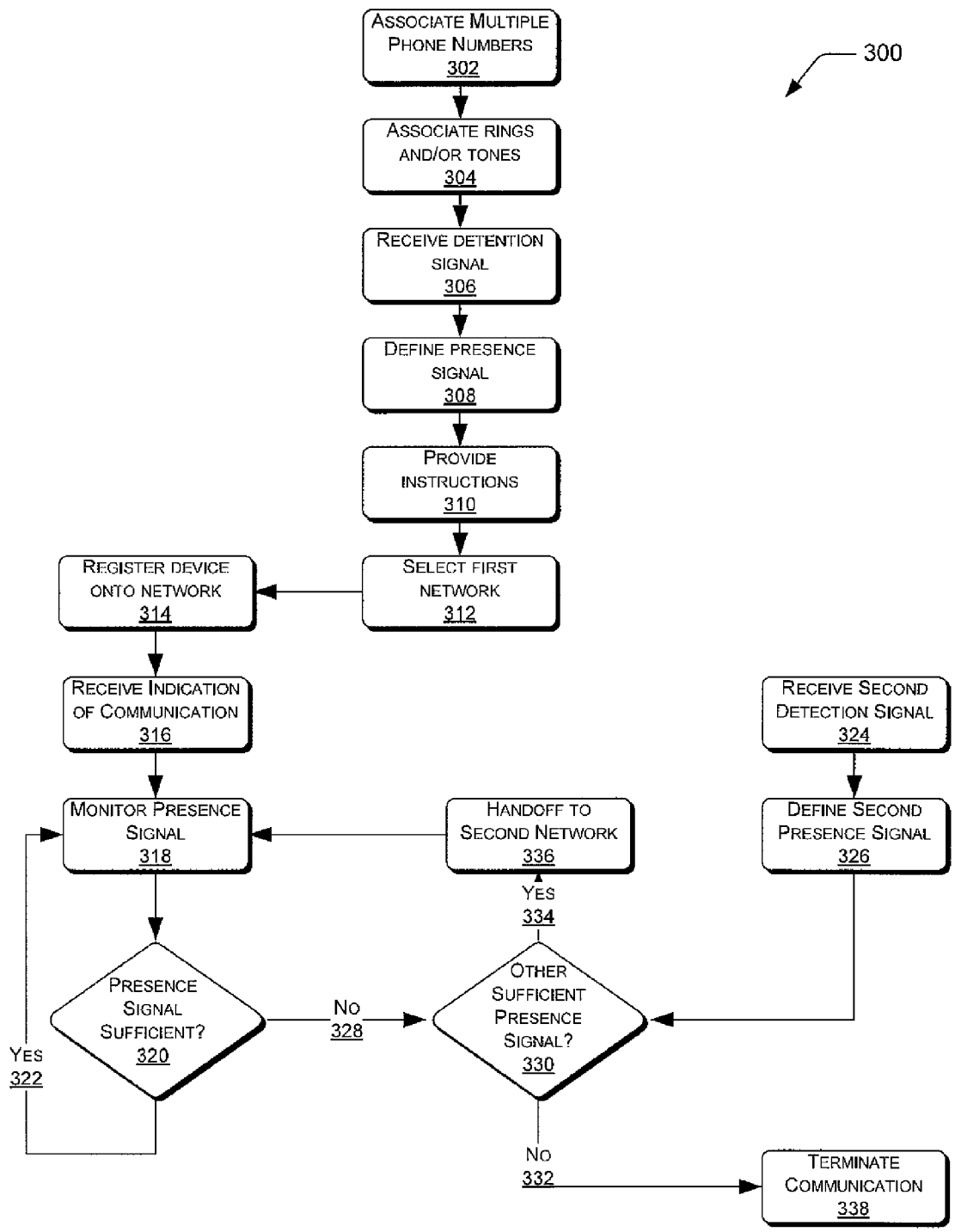
FIG. 3 is a flow diagram of a process for handling simultaneous rings or forwarding calls from a first network to a second network.

FIG. 3 shows a process flow 300 for handing over ongoing communications involving the mobile communication device 104 associated with multiple numbers from a first network to a second network. For ease of understanding, FIG. 3 show various aspects of the method 300 are within separate blocks. However, FIG. 3 shows these blocks in the order presented only for convenience, but not for limitation. Implementations of the processing represented in these blocks may perform this processing in any order, without departing from the scope and spirit of the description herein.

In addition, implementations of the process flow 300 may combine or further subdivide any number of the described process blocks. Moreover, implementations of the process flow 300 may omit one or more of the described blocks. For convenience only, the process flow 300 is described in connection with certain components shown in FIGS. 1 and 2. However, it is understood that the process flow 300 may be performed with other components without departing from the spirit and scope of the description.

Block 302 represents associating multiple phone numbers with the mobile communication device 104. By way of illustration, the mobile communication device 104 may receive simultaneous rings or calls directed to the primary number (e.g., 104a in FIG. 1) which is directly connected with the mobile communication device and may also receive simultaneous rings or calls to the identified number associated with a business enterprise, (e.g., 106a in FIG. 1).

Block 304 represents associating distinctive ring functions and/or tones to distinguish between incoming calls to the multiple numbers. Additionally, distinctive ring functions and tones may identify voice mail messages left for these multiple numbers. Finally, these distinctive ring functions and tones may announce any incoming calls while the mobile communication device is in use.

Block 306 represents receiving a device detection signal, which indicates that a mobile communication device 104 is proximate to a first communication network. The communication network may be characterized as, for example, a circuit-switched network or a packet-switched network. Block 308 represents defining a presence signal that varies in response to the condition of the device detection signal.

Block 310 represents providing instructions for simultaneous rings to the mobile communication device and to the second communication device for communication that are sent to the mobile communication device and to the second communication device. Block 310 may also represent providing instructions to forward calls that are dialed to the second communication device(s) to the mobile communication device. Alternatively, calls dialed or messages sent to the second communication device(s) may automatically 'ring' on the mobile communication device without any instructions.

Block 312 represents selecting the first network for transmitting voice, data, text, multimedia, and the like between the mobile communication device and the second communication device. Block 312 may include applying one or more thresholds to the presence signal to determine whether the condition of the connection with the mobile communication device permits transmitting voice, data, text, multimedia, and the like over this connection.

Block 314 represents registering the mobile communication device onto the network as long as the quality and/or strength of the connection with the mobile communication device permits. For example, block 314 may be performed if the threshold analysis referred to in block 312 above is satisfied.

Block 316 represents receiving an indication of a communication between the mobile communication device and the person and/or the second communication device. In an exemplary embodiment, a caller dials an identified number associated with a landline phone for a business enterprise, which has been routed to the mobile communication device. The user answers the call, indicating communication between the two devices. In other embodiments, the user 102 may use the mobile communication device to access e-mail or voice mail, to access computer files, or the like.

Block 318 represents monitoring the condition of the presence signal for any signs of improvement or degradation. The mobile communication device may encounter a variety of different physical environments along the path. These different physical environments may interfere with signals passing to or from the mobile communication device, causing the degradation of the device detection signal and/or the presence signal. Block 318 may include monitoring the presence signal over time to assess the condition of the connection with the mobile communication device on an ongoing basis.

Block 320 represents evaluating whether the presence signal is sufficient to permit continued communications of voice, data, text, multimedia, to occur over the network selected. If the presence signal indicates that the connection with the mobile communication device is sufficient, then the process flow may take Yes branch 322 back to block 318 to continue monitoring the presence signal. Blocks 318 and 320 may be repeated at any suitable interval to monitor the continued state of the connection with the mobile communication device.

In parallel with the processing described, the process flow 300 may detect at least a second potential connection path for the mobile communication device. More specifically, block 324 represents receiving a second device detection signal. This second device detection signal may be received in response to the mobile communication device moving into the proximity of a second network, in addition to the network selected in block 312.

Block 326 represents defining a second presence signal associated with the mobile communication device, which indicates the condition of a potential connection between the mobile communication device and the second network. Blocks 324-326 may be repeated for other networks, as the mobile communication device passes into the proximity of other networks. The process flow 300 may present backup or secondary connections to the mobile communication device, in the event that the connection with the first network degrades beyond acceptable levels.

Returning to block 320, if the presence signal associated with the first network degrades to fall below acceptable thresholds, then the process flow 300 may take No branch 328 to block 330. Block 330 evaluates whether a presence signal associated with at least a second network is sufficient to permit the communication referenced in block 316 to be handed over to the second network. For example, block 330 may include analyzing at least the second presence signal referenced in block 326. If more than one backup or secondary network is available for consideration, block 330 may be repeated to evaluate presence signals associated with these additional backup or secondary networks as candidates for receiving the handover.

From block 330, if no additional presence signals indicate that the corresponding networks are suitable for receiving the handover, then the process flow may take No branch 332 to block 338 to terminate the ongoing communication if the signal from the first network is lost altogether.

Returning to block 330, if a presence signal associated with another network, not the same as the first network, has sufficient strength and/or quality, then the process flow 300 may take Yes branch 334 to block 336. Block 336 represents handing over the ongoing communication to the second network. After completing the handover, the process flow 300 may proceed to block 318, to monitor the presence signal associated with the second network. From block 318, the process flow 300 may proceed through subsequent blocks 320.

As an example of the handover operation, assume that the user is using the mobile communication device to participate in an ongoing communication while walking outside. Blocks 302-314 may represent the processing involved with registering the user's mobile communication device onto the circuit-switched cellular network. Block 316 may include receiving an indication of an ongoing communication. While the user is outside the building, the mobile communication device may be coupled directly to a circuit-switched cellular network.

Assume further that, at some point, the user walks inside a building while still participating in the ongoing communication. When the user enters the building, the mobile communication device may lose connection with the cellular network, or service may degrade, because signals to or from the cellular network cannot penetrate the physical construction of the building. In this event, blocks 318 and 320 may detect and track this signal degradation. While the presence signal is deteriorating, but before dropping out entirely, block 330 may search for a suitable backup network. For example, a packet-switched network inside the building may provide a suitable backup network, such as an in-building WiFi LAN. If such a suitable backup network is found, block 336 hands the communication over to the backup network. Because the process flow 300 detects ongoing deterioration and hands over the communication before the first network drops out, the user's ongoing communication or data transfer is not interrupted significantly when the user transitions from one physical environment to another, and from one network to another network.

Figure 4:
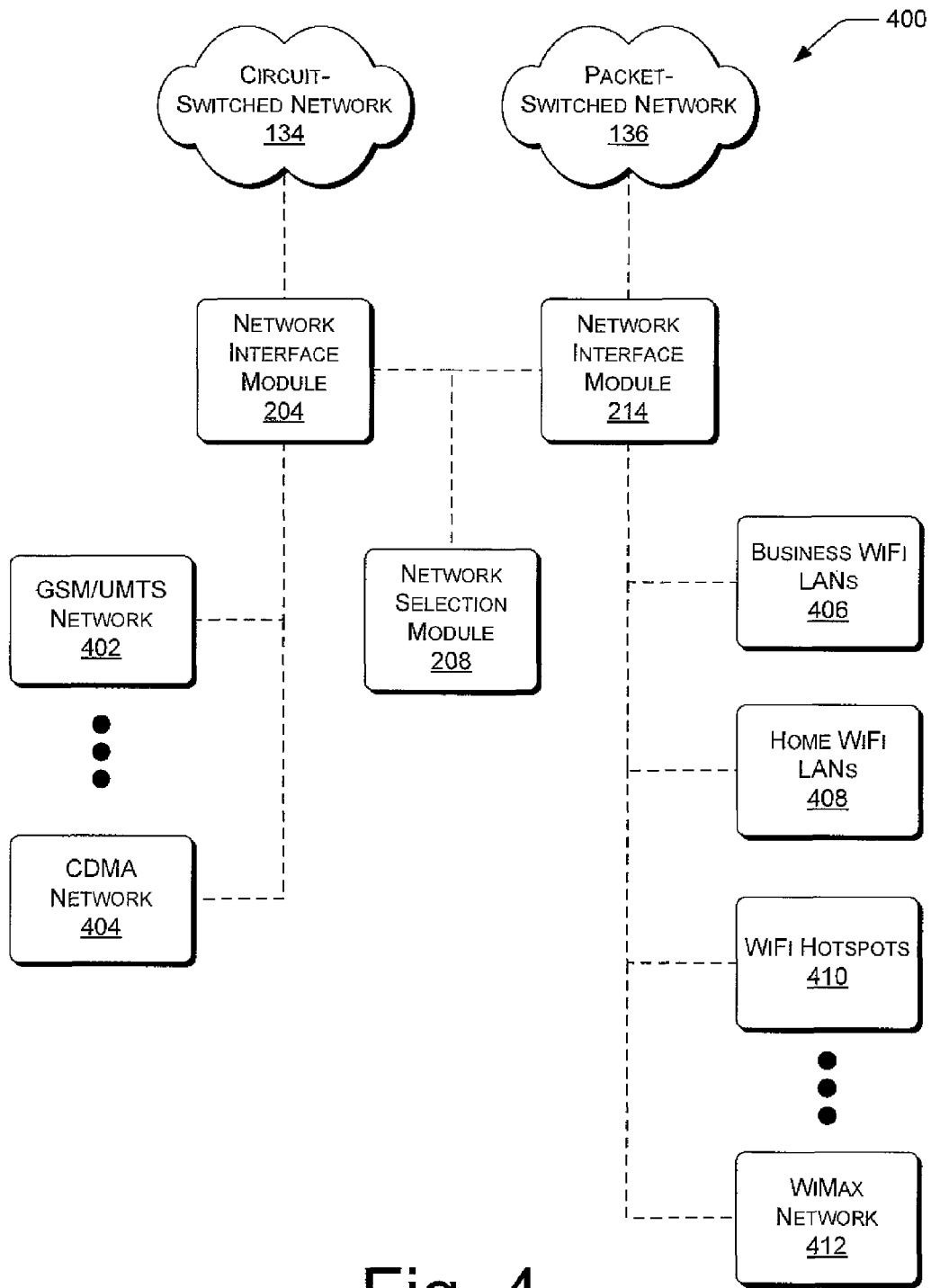
FIG. 4 is a block diagram illustrating various types of circuit-switched networks and packet-switched networks that may be employed in the environments.

FIG. 4 illustrates network types into two categories 400: circuit-switched network types 134 and packet-switched network types 136. FIG. 4 also relates the network interface modules 204 and 214 and the network module 208 as associated with several types of circuit-switched networks and packet-switched networks, respectively. For example, the network interface module 204 may be compatible with a GSM/UMTS cellular network 402, a CDMA cellular network 404, and/or other types of circuit-switched networks.

Turning to the network interface module 214, it may be compatible with one or more business WiFi LANs 406, home WiFi LANs 408, public WiFi hotspots 410, WiMAX wide area networks 412, and/or other types of packet-switched networks. Furthermore, the user 102 may use the mobile communication device 104 at home by accessing a WiFi LAN 408 located in their home. The WiFi LAN may enable the subscriber to access a broadband data service, such as Digital Subscriber Line (DSL) service, satellite Internet service, or cable modem service.

Application Servers

Figure 5:
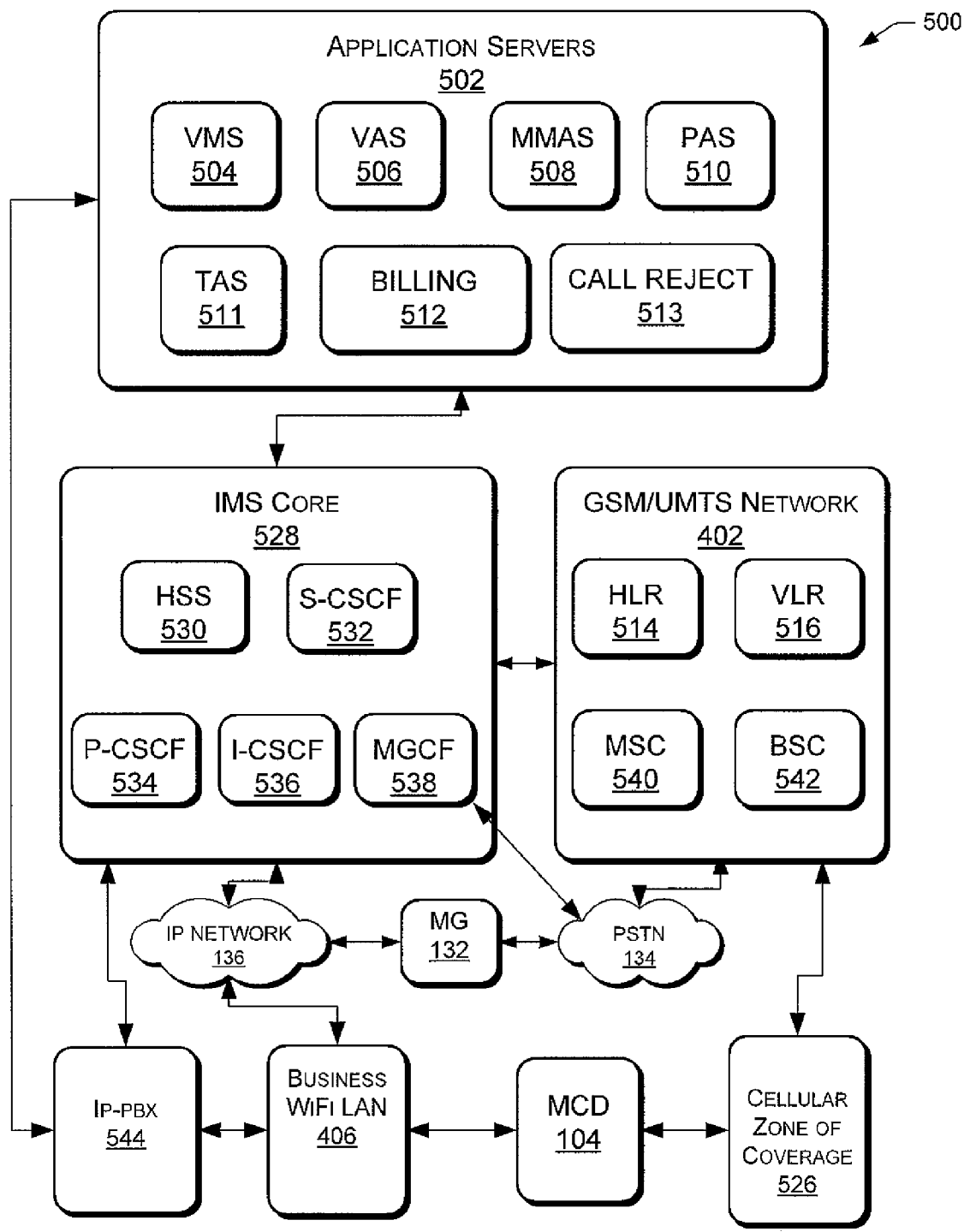
FIG. 5 is a block diagram of an exemplary operating system for implementing seamless enterprise and consumer mobility.

FIG. 5 shows an exemplary system 500, which includes a framework that may be characterized as having different layers. According to an exemplary embodiment, a set of application servers 502 may provide telecommunication services to the mobile communication device 104. These services include but are not limited to access to call forwarding, simultaneous ring, email, voice mail, and data applications, and may be considered as the top layer of the framework. For example, the application servers 502 may include, but are not limited to, a voice mail server (VMS) 504, a voice application server (VAS) 506, a mobility management application server (MMAS) 508, a presence application server (PAS) 510, a telephony application server 511, a billing server 512, and a call reject/deny notification server 513. Examples of other servers may include data application servers, email servers, media servers, or the like. This layer of application servers 502 may host and execute mobility telecommunication services upon receiving a signal from the mobile communication device 104 on any given network.

The application servers 502, and other servers may include respective processors that are adapted to access software stored on computer-readable media, and execute this software. This software may include one or more programs of computer-executable instructions stored in any appropriate programming language or code format.

The VAS 506 includes certain applications and sub-applications that may be implemented to provide telecommunication services to the mobile communication device 104. The equipment for providing these telecommunication services maybe co-located with the application servers 502, or may be located on the premises of a telephone company provider who owns and manages the equipment, and offers the telecommunication services to customers in an outsourcing arrangement. These mobility telecommunication services may include messaging services, call forwarding, call transfer, call waiting, telephone conferences, services for Internet, and the like. Also the telecommunication services may include distinctive ring functions and/or tones. The telecommunications services may include features such as abbreviated dialing to members of a closed user group, call routing based on the time of day, and direct inward dial, where individual extensions are offered a direct and unique telephone number for incoming calls.

The VAS 506 may send incoming calls to the voice mail server (VMS) 504. In particular, the VMS 504 may store incoming messages for the related phone numbers, manage telephone messages, play different message greetings for the multiple numbers, and the like. The VMS 504 records telephone messages for users 102 who subscribe to a network service provider 126. The VMS 504 may store incoming messages while the user 102 is on the line. In addition, users 102 may forward received messages to the voice mailbox associated with another user, as well as playing various greeting messages for each of the multiple phone numbers associated with the mobile communication device. The VMS may play various greeting messages based on the identification of the caller or of the calling number, which may have access to a database, an enterprise, an address book, and the like.

Mobility Management Application Server

The mobility management application server (MMAS) 508 may host the network interface modules 204 and 214 and the network selection modules 208. The MMAS 508 establishes the registration status of the mobile communication device 104 by receiving the registration of the mobile communication device 104 from a profile subscriber server. In an exemplary embodiment, the user 102 is registered through the GSM/UMTS cellular network 402, which may include one or more profile subscriber servers, such as a home location register (HLR) 514 or a visitor location register (VLR) 516. The profile subscriber servers may initially inform the MMAS 508 of the registration of the mobile communication device 104. Furthermore, the MMAS 508 provides an update of the registration status to the profile subscriber servers, which may include, e.g., a Home Subscriber Server (HSS) 530 an HLR 514, and a VLR 516, and to the application servers 502, if appropriate.

The mobile communication device 104 may connect to various networks, including GSM/UMTS cellular networks 402, CDMA cellular network 404, business WiFi LANs 406, home WiFi LANs 408, Public WiFi Hotspots 410, and WiMAX Networks 412. Thus, another function of the MMAS 508 is to track the network that various mobile communication devices 104 are connected, to enable delivery of telecommunication services across different networks. By tracking the particular network to which the mobile communication device 104 is connected, the MMAS 508 may enable a subscriber using the mobile communication device 104 to access telecommunication services from the VAS 506, voice mail server 504, or other application servers 502. In this manner, the MMAS 508 may perform at least some of the functions of the network interface modules 204 and 214, and the network selection module 208.

In another exemplary embodiment, the MMAS 508 may determine that the mobile communication device 104 is within in a zone of coverage 526 served by, for example, the GSM/UMTS cellular network 402. In this scenario, the MMAS 508 may request that the VAS 506 or TAS 511 query the profile subscriber servers or the PAS 510 to obtain a network address or other identifier for the mobile communication device 104, defined in the context of the GSM/UMTS cellular network 402. Given this GSM/UMTS cellular network address at which the mobile communication device 104 is located, the VAS 506 or TAS 511 may then route calls directed to the primary number to the mobile communication device at this network address.

Furthermore, the mobility MMAS 508 manages transfers or handovers of calls from one network to another network. For example, the MMAS 508 may transfer calls from the Business WiFI LAN location 406 to the GSM/UTMS network 402, and vice versa. Thus, the MMAS 508 provides mobility across different networks, and seamless handovers or transfers between and among these different networks. The MMAS 508 may also transmit signals to and from the mobile communication device 104 over IP packet data networks and circuit switched cellular networks. Thus, the MMAS 508 establishes registration status and tracks the location of the handset 104 by identifying the network to which the handset 104 is connected at any given time. In another embodiment, the MMAS 508 receives the network address from the PAS 510. The MMAS 508 also maintains a communication session by providing the user 102 access to telecommunication services. Finally, the MMAS 508 converts or translates between the schemes and protocols as used in packet-switched data networks (e.g., a VoIP-based network) and as used in circuit-switched or POTS networks. These schemes and protocols may handle data transfers, addressing, or the like. As shown in FIG. 5, the application servers 502 may interface with an IMS Core 528 depending on the network to which the handset 104 is connected at a given time.

Presence Application Server

Another server is the presence application server (PAS) 510, which may host the presence interface modules 205 and 215, shown in FIG. 2. The PAS 510 may identify the network address that the mobile device may be connected to and send the information to the MMAS 508. In addition, the PAS 510 may send a physical location or a presence of the mobile communication device to the VAS 506 or the TAS 511 to route calls.

In exemplary embodiments, the PAS 510 may identify the network address that the mobile communication device is connected and send the information to the MMAS 508, the VAS 506, and the TAS 511. The MMAS 508 may track the network location on an ongoing basis, and enable the user to access telecommunication services using the mobile communication device. The VAS 506 or TAS 511 may then provide simultaneous ringing to the primary number to the mobile communication device, using the network address identified by the PAS 510.

In other exemplary embodiments, the MMAS 508 may query the PAS 510 to obtain a network address or other identifier for the mobile communication device 104. Given this network address at which the mobile communication device 104 is located, the MMAS 508 may track the network address of the mobile communication device. The MMAS 508 may communicate the address to the VAS 506 or TAS 511, which may provide simultaneous ring and forward calls to the primary number of the mobile communication device at this network address.

In exemplary embodiments, the PAS 510 may determine that the mobile communication device 104 is at a Business WiFi LAN location 406 served by the packet-switched network 136. The PAS may associate an IP network address with the mobile communication device 104 and return this address upon request to the MMAS 508, VAS 506 or TAS 511. The VAS 506 or TAS 511 may then route incoming calls to the mobile communication device using this network address within the Business WiFi LAN 406, causing the landline business phone to ring first and then the mobile communication device 104 to ring second. If the user 102 does not answer the call to the mobile communication device 104, the VAS 506 may send the call to an appropriate voice mail server (VMS) 504.

Telephony Application Server

In exemplary embodiments, the TAS 511 may carry out functions including automatic call forwarding, unified messaging, call-termination or subscriber-independent applications. For example, the TAS may route an incoming call or message sent to the identified number to the mobile communication device. For example, the TAS may forward calls to the mobile communication device from the second communication device and/or a third communication device. Furthermore, the routed call may be sent to voice mail, voice application server, and the like if there is no response from the mobile communication device.

In exemplary embodiments, the TAS 511 may forward an incoming call or incoming message directed to the second communication device to the primary number associated based on the information provided by the PAS 510. The TAS queries the PAS to identify the presence or physical location of the mobile communication device. By way of illustration, the PAS identifies the physical location of the mobile communication device and sends the network location to the TAS. For example, the PAS and the TAS may determine whether the incoming call is routed to the mobile communication device. Furthermore, the forwarded call may be sent to voice mail, voice application server, and the like if there is no response.

The billing server 512 manages and tracks the subscriber's account and telecommunication services. The billing server may operate in conjunction with the other application servers. The call reject server 513 may identify callers placed on a list to not provide simultaneous rings or call forwarding to the mobile communication device. The list may be based on the identify of the caller or the number of the caller. Furthermore, the call reject server 513 may not provide simultaneous rings or forward calls from the identified number to the primary number, as requested by the user. For example, the user may be on vacation and wish to not receive any business related calls from the identified number on the mobile communication device. Thus, the call reject server may send the call to voice mail.

Internet Protocol Multimedia Subsystem (IMS)

Shown in FIG. 5, the system 500 may include an Internet protocol multimedia subsystem (IMS) core 528, an example implementation of the servers within the IMS core 528. The MMAS may control functions within the IMS core 528. These servers may be suitable for processing data packets transmitted over, for example, the IP network 136. Overall, the IMS core provides mobile and fixed multimedia services to enable the handset 104 to communicate over IP-based networks. In implementations, the IMS core may enable users 102 to access telecommunication services using the mobile communication device 104 seamlessly across different types of networks within a given enterprise. For example, the mobile communication device 104 may move within this enterprise between, for example, the business WiFi LAN location 406 and the cellular zone of coverage 526, and vice versa. As the mobile communication device 104 moves in this manner, the IMS core may minimize the impact of geography and other physical or environmental factors on such services, by transferring or handing over the mobile communication device to multiple different networks and types of networks, as appropriate. Thus, the user may receive calls directed to the primary number on the mobile communication device in different types of networks within a given enterprise.

The IMS core 528 may be implemented to communicate using a session initiation protocol (SIP). SIP enables handovers of ongoing communications between, for example, the business WiFi LAN 406 and the cellular zone of coverage 526. SIP allows telecommunications between multiple proxy and location servers by leaving the session and connection details to the servers. Furthermore, SIP offers a well-defined mechanism for device-to-device signaling, with, for example, the mobile communication device 104. In the SIP-based implementation, the servers may be intelligent gateways capable of transmitting and/or receiving requests, commands, and/or data to the subscribers' location. The servers may also register and/or authenticate the subscribers' data, as well as provide features and services to the subscribers.

The network elements in the IMS Core 528 may include, but are not limited to, a HSS 530, a serving call session control function (S-CSCF) server 532, a proxy call session control function (P-CSCF) server 534, an interrogating call session control function (I-CSCF) server 536, and a media gateway control function (MGCF) 538.

The HSS 530 may enable the user of the handset 104 to register with the IMS core 528. The HSS 530 may maintain a database containing profiles of various subscribers, as well as one or more initial filter criteria relating to the mobile communication device 104. The HSS may identify any filters that may be engaged in call control logic to assist in call processing and to provide services during the call. The HSS 530 may also define network addresses associated with the application servers 502 that are engaged in a given call session to provide consumer telecommunication services. In an exemplary embodiment, the HSS 530 may identify the distinctive ring functions and/or tones for each of the multiple phone numbers. Therefore, the HSS 530 may authenticate and/or register subscribers who wish to access services using the handsets 104, and may record the network to which the handset 104 is currently connected, as appropriate. Furthermore, the HSS 530 may store any authentication and/or registration information associated with the subscribers and/or services.

The Proxy-Call Session Control Function (P-CSCF) server 534 may provide an entry server for the IMS core 528. The P-CSCF server may be used in implementations that include SIP-based technology. The P-CSCF server may process signaling messages defined under SIP, and may compress or decompress SIP messages. The P-CSCF server may be the first and/or the last IMS network element that communicates with an end point IMS device. These IMS devices may include the handsets 104, which in turn, may include (but are not limited to) land line telephones, devices using any Internet telephony technology, computers (whether desktop or mobile) that are connected to wireless or landline communication networks, personal digital assistants, WiFi SIP phones, and the like.

The Interrogating-Call Session Control Function (I-CSCF) server 536 may allow remote servers to locate and communicate with the IMS core 528. The I-CSCF server may also provide another entry point to the IMS core 528 from another network. For example, the I-CSCF server may provide an entry point for the circuit-switched network 134, which may take the form of a public-switched telephone network (PSTN). The I-CSCF server may also provide an entry point for the GSM/UMTS cellular network 402, and/or the IP network 136. Remote servers may use the I-CSCF server 536 as an entry point to the IMS core 528 for all SIP packets by querying the HSS 530 to obtain an address for the I-CSCF server 536, and thereafter directing SIP packets to this address. Once the I-CSCF server 536 has retrieved a location for a given handset 104, the I-CSCF server 536 may transmit any SIP packets that are addressed to the given handset to an appropriate Serving-Call Session Control Function (S-CSCF) server 532, which is now described in more detail.

The Serving-Call Session Control Function (S-CSCF) server 532 may operate as a primary SIP server, and may also control respective call sessions for the endpoint mobile communication devices in the call, for example, the mobile communication device 104. In an exemplary embodiment, the subscriber 102 may register with the network, and the S-CSCF server may interrogate the HSS to obtain information about the subscriber. For example, the S-CSCF server may download and upload profiles of the subscriber, may extract information about the subscriber's services, and may obtain addresses for the initial filters that are associated with the subscriber's services. Additional functions of the S-CSCF server may include handling SIP registrations, and forwarding SIP messages to the application servers 502. Additionally, the S-CSCF server may set up call sessions with the mobile communication device 104, may engage the VAS 506 or TAS 511 while setting-up the call sessions, may establish a call session with an answering device (such as mobile communication device 104 and VMS 504), and may terminate the call session upon receiving a suitable message to end the call.

The IMS core 528 allows application server providers and operators to use different underlying architectures for network access. Service providers may include telephone service providers, such as interexchange and local exchange carriers including incumbent and/or competitive exchange carriers. Other telecommunication service providers may include Internet telephone service providers (VoIP), wireless telephone service providers (cellular), and the like. By using communication services with various service providers, communication may be integrated seamlessly across multiple different types of networks. In particular, the IMS core may operate with landline, wireless and mobile networks, including broadband networks such as coaxial cable-based networks, digital subscriber line (DSL) networks, W-CDMA, CDMA, GSM, WLAN and the like.

The media gateway control function (MGCF) 538 enables multimedia communications across networks. The MGCF 538 may serve as an interface between a circuit-switched network (PSTN) and a packet-switched network (VoIP). The MGCF may receive a call from a circuit-switched network (e.g., the PSTN 134) or GSM/UMTS cellular network 402 and translate to an IP-based protocol suitable for the IP network 136 so that the IMS core may process the call. The MGCF 538 may translate between disparate telecommunication networks, such as the PSTN 134 and the IP network 136, or succeeding generations of such networks, 2G, 3G, and the like. The MGCF converts between the transmissions and coding techniques used by these different networks. Additionally, the MGCF may provide call control and signaling functionality. Because the IMS core has the above capabilities, it may be characterized as being "access network independent".

The IMS core achieves the capabilities described above through open interfaces defined between a control layer and a service layer. The control layer may include the servers 530, 532, 534, and 536, while the service layer may include the application servers 502. These open interfaces allow elements and calls or sessions to be handed over between different types of networks. The IMS core allows consumer mobility and seamless handover of a user's calls between, for example, a landline network connection at the business WiFi LAN location 406 and a cellular connection within the zone of coverage 526, while the user is roaming or traveling between two locations. While FIG. 5 illustrates the business WiFi LAN location 406, it is understood that the home WiFi LAN 408, the WiFi hotspots 410, and the WiMAX network 412 may be included as well.

For example, the user 102 with the mobile communication device 104 may access the landline in the office location. When the mobile communication device 104 is proximate to the business WiFi LAN location 406, the mobile communication device 104 may sense radio signals from both the business WiFi LAN 406 and the GSM/UMTS cellular network 402, but nevertheless may be biased towards communicating over the business WiFi LAN 406. When the mobile communication device 104 moves between the business WiFi LAN 406 and the GSM/UMTS cellular network 402, the transition may be seamless from the perspective of the user. In providing the foregoing functions, the IMS core provides access to IP-based network services, provided by, for example, the VMS 504, VAS 506, and the like.

GSM/UMTS Cellular Network

The GSM/UMTS cellular network may include a home location register (HLR) 514, a visitor location register (VLR) 516, a mobile switching center (MSC) 540, and a base station controller (BSC) 542. The HLR 514 is a location register to which a user identity is assigned for recording purposes. The HLR registers a wireless cellular phone, such as the mobile communication device 104, for service by creating a record in a database. The HLR may create this record when the wireless cellular phone is turned on and is located within a wireless service area where calls may be transmitted to the mobile communication device. The HLR may be implemented in wireless cellular networks including, but not limited to, an advanced mobile phone system (AMPS), a global system for mobile communications (GSM), a personal communications systems, and the like. The HLR may also store authentication and/or registration information. It may also include subscriber data related to features and services to which the user has subscribed. The HLR may also define network addresses associated with the application servers 502 that are engaged in a given call session to provide consumer telecommunication services. In an exemplary embodiment, the HLR may identify the distinctive ring functions and/or tones for each of the multiple phone numbers. In non-limiting embodiments, a user identity, a user name, a user number, and/or a password may be used to register and/or authenticate subscriber information.

The VLR 516 is a location register used by the MSC 540 to retrieve information for handling of calls to or from a visiting subscriber. A visiting subscriber is understood to be a subscriber other than a subscriber registered in the HLR. The VLR informs the HLR 514 when a visiting subscriber (or other user of the subscriber's handset 104) has entered a coverage area, and indicates which services the visiting subscriber may access. Thus, the HLR may verify the features to which a given user has access, when the user is roaming outside the coverage area supported by a given wireless provider. The VLR may also delete a subscriber record after a given period in which no activity occurs. For example, the HLR 514 or VLR 516 may inform the MMAS 508 whether the user 102 is in an active status, having registered the mobile communication device 104 or in a non-active status.

The mobile switching center (MSC) 540 may be implemented as a cellular site accessible via radio frequency signals. The MSC may deliver calls to subscribers or users 102 of the mobile communication devices 104, based on information from the HLR or the VLR. Furthermore, the MSC may provide an interface for user traffic between the GSM/UMTS cellular network 402 and PSTNs 134 or other MSCs in the same or other networks. The MSC may also provide calling and mobility management for circuit-switched networks (e.g., PSTN 134). Having provided this interface, the MSC enables transmission of signals from the circuit-switched network to any other network. Thus, the MSC provides signaling for inter-system handoffs, as well as facilitating automatic roaming. The HLR or VLR may serve more than one MSC.

In an exemplary embodiment, the base station controller (BSC) 542 transmits and receives voice signals over the radio spectrum to and from the MSC. The BSC may allocate radio channels among various users of the mobile communication devices, and may operate at various different radio frequencies. In implementations, the MSC 540 may facilitate data transfer between the mobile communication device, the BSC, and a wireless data gateway (not shown) in the cellular network. The HLA may store information indicating a particular MSC on which the mobile communication device 104 is registered.

The system 500 may also include the media gateway (MG) 132 that provides interoperability between the PSTN 134 and the IP network 136. The media gateway converts packet-switched voice, data, text, and multimedia traffic to circuit switched voice, data, text, and multimedia traffic, and vice versa.

The exemplary system 500 operates on signals from the mobile communication device 104, which executes software implemented as described in combination with the application servers 502, the IMS core 528 and/or within the GSM/UMTS cellular network 402, the PSTN 128, and the IP network 130. These signals may include a request, a command and/or data, text messages, voice transmissions, multimedia transmissions, computer-readable instructions, and the like in analog or digital form. Accordingly, the system 500 may track and manage call progress. The system may also convert or translate between telephone numbers and addressing schemes used on a data or IP-based network 136 and those used on a GSM/UMTS cellular network 402.

Mobile Communication Device

When connected to the business WiFi LAN location 406, the handset 104 may connect to telecommunication services through the IP network 136. The handset 104 may access telecommunication services using either unlicensed wireless or licensed cellular technologies. An example of a suitable unlicensed wireless technology is the IEEE 802.11 wireless networking standard. An example of a suitable licensed cellular technology is GSM or CDMA. A non-limiting example of the handset 104 is the cordless WiFi SIP phone.

In possible implementations, the mobile communication device 104 may be designed to work on more than one frequency, including but not limited to frequencies defined under advanced mobile phone system, global system for mobile communications (GSM), personal communications systems and the like. This capability to operate on different frequencies allows the handset 104 to operate in regions that use different frequencies (e.g., 900 MHz, 1850 MHz, or other frequencies). To support digital communications, the handset 104 may operate under schemes such as time division multiple access (TDMA), code division multiple access (CDMA), advanced mobile phone system (AMPS), general packet radio service (GPRS), and universal mobile telecommunications system (UMTS). The mobile communication device 104 may also be compatible with a second generation (2G) or a third generation (3G) network. As compared to other wireless networks, 2G or 3G networks may have greater bandwidth capacity, which may allow faster data download rates.

The mobile communication device 104 allows for a seamless handover of telecommunication services between the GSM/UMTS cellular network 402 and the IP network 136. The mobile communication device 104 may include control logic that sends and receives information regarding a signal addressed to the mobile communication device 104. The mobile communication device 104 registers with a profile subscriber server, and establishes registration status with the MMAS 208, which may track the location of the mobile communication device. More particularly, the handset 104 may communicate from the office location using the IP network. From the office location, the handset 104 may then move into the mobile location, which uses the cellular network, independent of constraints arising from geographic or regional differences, network incompatibilities, or differences in schemes for implementing telephone numbers or other addresses. The mobile location enables consumer mobility from one position because the user 102 need not be connected to a particular network or landline. For example, the mobile location may represent any location where the mobile communication device 104 is outside of the office location. Mobile locations may include locations where the user 102 may move freely. Other mobile locations may include sites, such as public areas, parks, retail stores, universities, schools, and WiFi hot spots.

The mobile communication device is in communication with a call distributor, such as an IP private branch exchange (PBX) 544, which uses the IP network 136 to carry voice calls and connects to the application servers 502. The IP-PBX contains a soft-switch, which is a software program that manages call traffic and connects calls from one phone to another. Generally, soft-switches may provide features including call processing, measuring and monitoring capabilities, call detail reports for the IP endpoints, signaling notifications, flexible call routing and redirection, and the like.

The soft-switch in the IP-PBX 544 manages and connects calls to and from phones within the enterprise, including mobile devices 104, 106. Also, the soft-switch may include the full GSM, CDMA, or other cellular feature set provided by the cellular carrier. Because the soft-switch is embedded in the IP-PBX 544, mobile devices 104 registered with the IP-PBX 544 retain their full functionality and host of features offered by or purchased from the cellular carrier on the cellular network 402. Thus, users can use all the functions of their cell phones or other mobile devices within the enterprise. The IP-PBX 544 with the embedded soft switch acts as a small standalone cellular switch, with functionality comparable to a standard cellular switch of a cellular network.

The IP-PBX 544 may include a registered visitor database such as a visitor location register (VLR), a home location register (HLR), and an enterprise customer database. The VLR maintains a list of all mobile devices 104 currently in the coverage area of the IP-PBX 544, regardless of whether the mobile devices are authorized to access the enterprise. The HLR maintains a list of subscriber profiles of enterprise wireless users and/or mobile devices 104 that are authorized to access the enterprise. The HLR may also maintain a rule set for determining how and whether to handle calls placed by visitors to the enterprise (i.e., mobile devices not registered with the enterprise IP-PBX 544). The enterprise customer database is a readily modifiable database of customer profiles administered by the enterprise, which is used to periodically populate information into the HLR. The customer database may, for example, define a list of customers (e.g., employees, clients, etc.) and/or mobile devices that are authorized to access the enterprise, define the features available to end users, rule sets about what information end users can change about their profiles (e.g., PBX features, cellular features, etc.). Typically, the customer database is updated by information technology (IT) staff of the enterprise, or directly by the end mobile users. The customer database may be accessed and updated using any suitable interface, such as a web interface, a direct interface on the mobile device, or the like.

Flow Process

Figure 6:
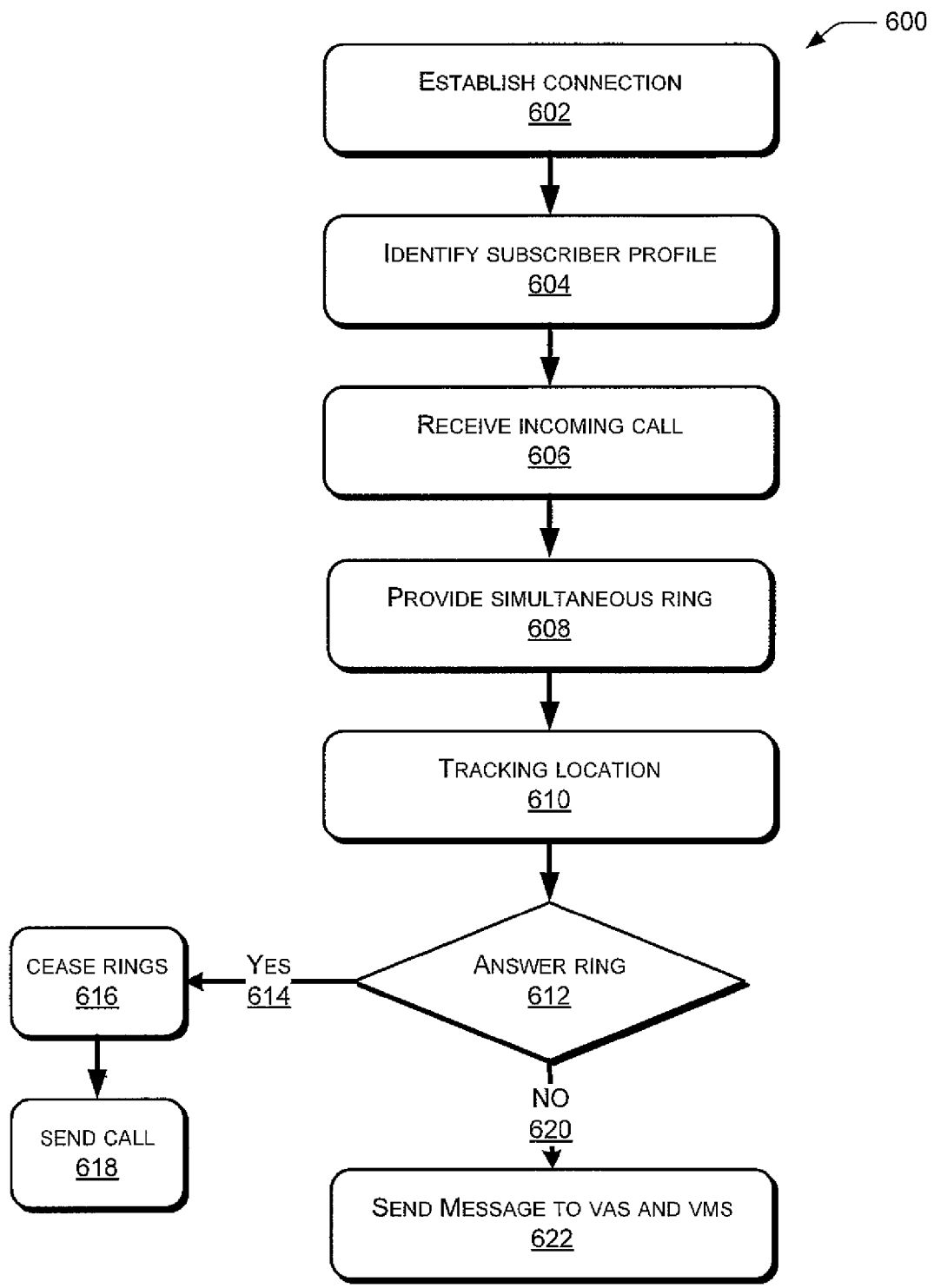
FIG. 6 is a flow diagram of a process for providing simultaneous rings to a primary number associated with the mobile communication device and to one or more identified numbers associated with one or more second communication devices.

FIG. 6 illustrates an exemplary method 600 that is performed to support a mobile communication device. The method 600 may be performed, at least in part, when the mobile communication device 104 is turned on or placed in a mode in which the mobile communication device 104 may connect to a circuit-switched network, such as the PSTN 134.

Block 602 represents establishing a network connection for the mobile communication device. For example, a first detection signal and a presence signal associated with a first network are generated in response to the mobile communication device coming into proximity to the first network. If the mobile communication device comes into proximity to a second network, a second detection signal and a second presence signal associated with the second network are generated.

Block 604 represents identifying a subscriber profile of the mobile communication device. The subscriber profile may maintain a rule set for determining how and when to simultaneously ring and forward calls to the mobile communication device. The subscriber profile may be handled by the HLR, HSS, VAS, or TAS. Block 604 represents determining the subscriber profile and any "initial filter criteria" associated with the subscriber's services. The "filter criteria" defines the different application servers 502 that are engaged in the call session to provide applications and services.

In another example, the HSS may identify any filters that may be engaged in call control logic to assist in call processing and to provide services during the call. In some implementations, block 604 may include, for example, the S-CSCF 532 querying the HLR 514. In turn, the HLR 514 may define the application servers 502 that are engaged in the call to provide telecommunication services and ensure consumer mobility. Afterwards, the S-CSCF 532 passes control of the call to the VAS 506 and/or the TAS 511.

In block 604, the VAS 506 queries the HSS 530 to determine the subscriber profile for telecommunication services and queries the MMAS 508 for location. The VAS 506 queries the HSS 530 for the subscriber settings for consumer telecommunication services, such as any services outsourced to a third party, voice mail, distinctive ring functions, tones, and the like.

Block 606 represents receiving an incoming call from, for example, to the second communication device 106. This incoming call to the second communication device 106 may be dialed to, for example, an identified number 106(a) ... (n) ... such as an office telephone number shown in the FIG. 1. Block 606 may be performed when the second communication device is in communication with a circuit-switched network, such as the PSTN.

Block 608 represents providing the simultaneous ring for the call that is dialed to the office phone number (e.g., 106(a)) to the mobile communication device 104 and to the second communication device (office phone number). Therefore, the PSTN routes the ring for the call to the MGCF 538. Block 608 represents, for example, the MGCF 538 establishing an SIP connection through an IP network, such as the IP network 136. The MGCF 538 may receive the call from a circuit-switched network (e.g., the PSTN 134 or the GSM/UMTS cellular network 402) and translate the circuit-switched traffic to IP-based traffic so that the IMS core 528 may handle the call. The MGCF 538 provides call control and signaling functionality. In another alternative, the MG 138 may be used to perform similar functions to the MGCF 538.

Block 608 may include querying the HSS 530 to determine which S-CSCF 532 supports the subscriber's telecommunication services. The I-CSCF 536 provides the entry point of call to the IMS core 528 from another network, such as the PSTN 134. Once the I-CSCF 536 has queried the HSS 530, the HSS 530 returns the profile subscriber information to the I-CSCF 536. The I-CSCF 536 passes control to the identified S-CSCF 532.

Block 610 represents tracking the location of the mobile communication device. For example, the PAS 510 identifies the network address of the mobile communication device and sends the information to the MMAS 508. The VAS 506 or TAS 511 then queries the MMAS 508 to determine the location registration of the mobile communication device 104 in order to enhance consumer mobility.

In other embodiments, the MMAS 508 is configured to track the network with which the mobile communication device 104 is registered The MMAS 508 may also determine the registration status of the mobile communication device 104 and exchange commands, requests, and data signals with the mobile communication device 104. These signals may include text or voice-based information. The application servers 502 and the IMS 528 may be implemented based on the telecommunication services available. These services are implemented via the network during the initial subscriber set up or may be implemented on the control logic of the mobile communication device 104. In non-limiting exemplary embodiments, the mobile communication device 104 may support IP-based signaling or SIP signaling for simultaneous ring set up. In yet another non-limiting exemplary embodiment, the mobile communication device 104 may support both for simultaneous ring set up.

Block 612 represents answering the simultaneous ring on the mobile communication device (e.g., 104). In this manner, block 612 may facilitate tracking the location of the device 104. If the mobile communication device 104 is registered onto an IP network, the method 600 takes Yes branch 614 to block 616, which represents ceasing the rings to the second communication devices.

Block 618 represents sending to the MMAS 508 an address to which the mobile communication device 104 is registered on the IP network. The call is sent to the mobile communication device.

Returning to block 612, if the mobile communication device and/or the second communication device does not answer the simultaneous rings, the method 600 takes a No branch 620 to block 622. Block 622 represents sending an initial signal to the VAS 506 or to the TAS 511, which in turn sends a message to the appropriate VMS 504 to enable voice mail.

An exemplary embodiment may include the VAS receiving the network location from the PAS, and establishing a network connection to allow the mobile communication device access to telecommunication services.

Figure 7:
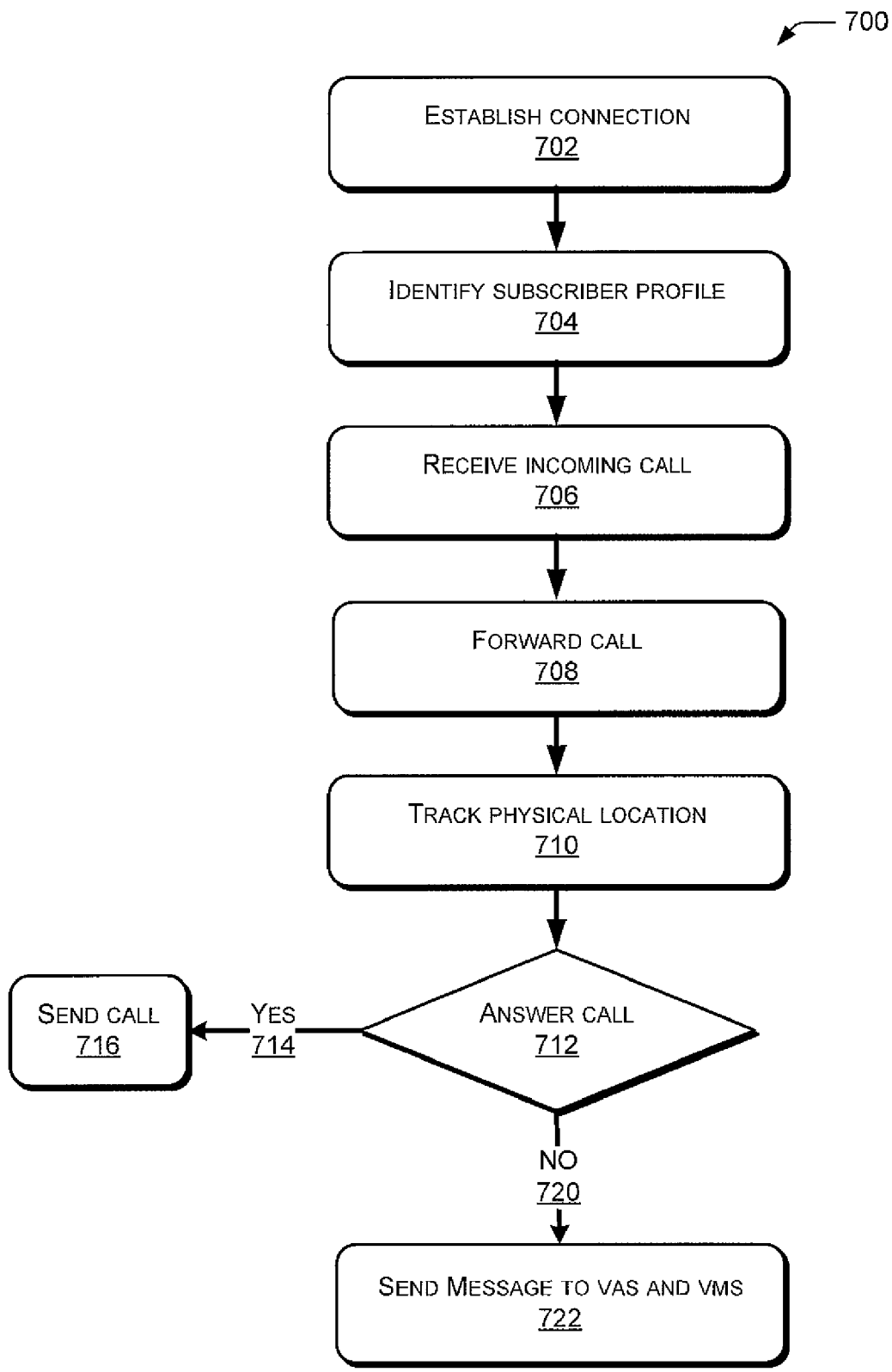
FIG. 7 is a flow diagram of a process for forwarding calls or messages directed to the one more identified numbers to the primary number associated with the mobile communication device

FIG. 7 illustrates, an exemplary method 700 that is performed to support a mobile communication device. The method 700 may be performed, at least in part, when the mobile communication device 104 is turned on or placed in a mode in which the mobile communication device 104 may connect to a circuit-switched network, such as the PSTN 134.

Block 702 represents establishing a network connection for the mobile communication device. For example, a first detection signal and a presence signal associated with a first network are generated in response to the mobile communication device coming into proximity to the first network. If the mobile communication device comes into proximity to a second network, a second detection signal and a second presence signal associated with the second network are generated.

Block 704 represents identifying a subscriber profile of the mobile communication device. The subscriber profile may maintain a rule set for determining how and whether to simultaneously ring and forward calls to the mobile communication device. The subscriber profile may be handled by the HLR, HSS, VAS, or TAS. Block 704 represents determining the subscriber profile and any "initial filter criteria" associated with the subscriber's services. The "filter criteria" defines the different application servers 502 that are engaged in the call session to provide applications and services. In another example, the HSS may identify any filters that may be engaged in call control logic to assist in call processing and to provide services during the call. In another example, the HLR 514 may define the application servers 502 that are engaged in the call to provide telecommunication services. Afterwards, the S-CSCF 532 passes control of the call to the VAS 506 and/or the TAS 511.

Block 706 represents receiving an incoming call from, for example, to the second communication device 106. This incoming call to the second communication device 106 may be dialed to, for example, an identified number 106(*a*) . . . (*n*) . . . such as an office telephone number shown in the FIG. 1. Block 706 may be performed when the second communication device is in communication with a circuit-switched network, such as the PSTN.

Block 708 represents forwarding the call that is dialed to the office phone number (e.g., 106(*a*)) to the mobile communication device 104. Therefore, the PSTN routes the call to the MGCF 538. Block 7?08 represents, for example, the MGCF 538 establishing an SIP connection through an IP network, such as the IP network 136. The MGCF 538 may receive the call from a circuit-switched network (e.g., the PSTN 134 or the GSM/UMTS cellular network 402) and translate the circuit-switched traffic to IP-based traffic so that the IMS core 528 may handle the call. The MGCF 538 provides call control and signaling functionality. In another alternative, the MG 138 may be used to perform similar functions to the MGCF 538.

Block 708 may include querying the HSS 530 to determine which S-CSCF 532 supports the subscriber's telecommunication services. The I-CSCF 536 provides the entry point of call to the IMS core 528 from another network, such as the PSTN 134. Once the I-CSCF 536 has queried the HSS 530, the HSS 530 returns the profile subscriber information to the I-CSCF 536. The I-CSCF 536 passes control to the identified S-CSCF 532.

Block 710 represents tracking the location of the mobile communication device. For example, the PAS 510 identifies the network address of the mobile communication device and sends the information to the MMAS 508. The VAS 506 or TAS 511 then queries the MMAS 508 to determine the location registration of the mobile communication device 104 in order to enhance consumer mobility.

In other embodiments, the MMAS 508 is configured to track the network with which the mobile communication device 104 is registered The MMAS 508 may also determine the registration status of the mobile communication device 104 and exchange commands, requests, and data signals with the mobile communication device 104. These signals may include text or voice-based information. The application servers 502 and the IMS 528 may be implemented based on the telecommunication services available. These services are implemented via the network during the initial subscriber set up or may be implemented on the control logic of the mobile communication device 104. In non-limiting exemplary embodiments, the mobile communication device 104 may support IP-based signaling or SIP signaling for simultaneous ring set up. In yet another non-limiting exemplary embodiment, the mobile communication device 104 may support both for simultaneous ring set up.

Block 712 represents answering the forwarded call on the mobile communication device (e.g., 104). In this manner, block 712 may facilitate tracking the location of the device 104. If the mobile communication device 104 is registered onto an IP network, the method 700 takes Yes branch 714 to block 716, which represents sending the call to the mobile communication device. Block 718 represents sending to the MMAS 508 an address to which the mobile communication device 104 is registered on the IP network.

Returning to block 712, if the mobile communication device does not answer the forwarded call, the method 700 takes a No branch 7620 to block 722. Block 722 represents sending an initial signal to the VAS 506 or to the TAS 511, which in turn sends a message to the appropriate VMS 504 to enable voice mail.

An exemplary embodiment may include the VAS receiving the network location from the PAS, and establishing a network connection to allow the mobile communication device access to telecommunication services.

The subject matter described above may be implemented in hardware, or software, or in both hardware and software. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method, for handling simultaneous rings, comprising:
   receiving, at a first network interface module, a first detection signal associated with a first network, wherein the first detection signal is generated by the first network in response to a communications device coming into proximity to the first network;
   generating, at a first presence interface module, a first presence signal associated with the first network, wherein the first presence signal varies in response to a condition of a first connection between the communications device and the first network;
   sending, from the first presence interface module, the first presence signal to a network selection module;
   evaluating, at the network selection module, the first presence signal to assess whether the condition of the first connection permits ongoing communication on the first network;
   if the network selection module determines that the condition of the first connection permits ongoing communication on the first network, and in response to one of an incoming call and a message sent to a number selected from a group of numbers consisting of (i) a primary number associated with the communications device and (ii) an identified number associated with an other communications device, the first network providing simultaneous rings to:
      the primary number associated with the communications device; and
      the associated with the other communications device; and
   if the network selection module determines that the condition of the first connection does not permit ongoing communication on the first network, the first network initiating hand over to a second network.

2. The method of claim 1, further comprising:
   receiving, at a second network interface module, at least a second detection signal associated with the second network, wherein the second detection signal is generated by the second network in response to the communications device coming into proximity of the second network;
   generating, at a second presence interface module, a second presence signal associated with the second network, wherein the second presence signal varies in response to a condition of a second connection between the communications device and the second network;
   sending, from the second presence interface module, the second presence signal to the network selection module; and
   the second network providing simultaneous rings to:
      the primary number associated with the communications device; and
      the identified number associated with the other communications device.

3. The method of claim 1, wherein providing the simultaneous rings to the primary number associated with the communications device and to the identified number associated with the other communications device comprises providing the simultaneous rings to the primary number with at least one of distinctive ring functions, tones, audible notifications, and visual indications.

4. The method of claim 1, wherein the communications device is one of a mobile device, a cellular phone, a personal digital assistant, and a computer.

5. The method of claim 1, wherein providing the simultaneous rings ceases after one of:
   a determined number of rings to the primary number and to the identified numbers; and
   a response to the simultaneous rings is received from one of the communications device via the primary number and the other communications device via the identified number.

6. The method of claim 1, further comprising at least one of routing calls based on a physical location of the communications device and routing calls based on one of a day and a time.

7. A non-transitory computer-readable media comprising computer-executable instructions that, when executed, perform a method comprising:
   receiving a first detection signal associated with a first network, wherein the first detection signal is generated by the first network in response to a communications device coming into proximity to the first network;
   generating a first presence signal associated with the first network, wherein the first presence signal varies in response to a condition of a first connection between the communications device and the first network;
   evaluating the first presence signal to assess whether the condition of the first connection permits ongoing communication on the first network;
   if it is determined that the condition of the first connection permits ongoing communication on the first network, and in response to one of an incoming call and a message sent to a number selected from a group of numbers consisting of (i) a primary number associated with the communications device and (ii) an identified number associated with an other communications device, providing simultaneous rings to:
      the primary number associated with the communications device; and
      the least one identified number associated with the other communications device; and
   if it is determined that the condition of the first connection does not permit ongoing communication on the first network, initiating hand over to a second network.

8. A method, for forwarding calls, comprising:
   receiving, at a first network interface module, a first detection signal associated with a first network, wherein the first detection signal is generated in response to a communications device coming into proximity to the first network;

generating, at a first presence interface module, a first presence signal associated with the first network, wherein the first presence signal varies in response to a condition of a first connection between the communications device and the first network;

evaluating, at a network selection module, the first presence signal to assess whether the condition of the first connection permits ongoing communication on the first network;

if the network selection module determines that the condition of the first connection permits ongoing communication on the first network, and in response to one of an incoming call and a message sent to a number associated with another device, other than a primary number of the communications device, the first network forwarding the call or message to the primary number of the communications device; and if the network selection module determines that the condition of the first connection does not permit ongoing communication on the first network, the first network initiating hand over to a second network.

9. The method of claim 8, further comprising: receiving, at a second network interface module, at least a second detection signal associated with the second network, wherein the second detection signal is generated in response to the communications device coming into proximity of the second network;

generating, at a second presence interface module, a second presence signal associated with the second network, wherein the second presence signal varies in response to a condition of a second connection between the communications device and the second network; and the second network forwarding calls dialed to the number associated with the other communications device to the primary number of the communications device.

10. The method of claim 9, wherein the other communications device is associated with at least one of a landline phone, a mobile device, a cellular phone, a personal digital assistant, and a computer.

11. The method of claim 10, wherein forwarding the call or message comprises at least one of forwarding multimedia, a video, an instant message, an email, a text message, and a voice mail message.

12. The method of claim 8, wherein forwarding the call or message comprises identifying an identification of a caller by at least one of associating distinctive ring functions to the number dialed, associating distinctive ring functions to an identification of the caller, associating distinctive tones to the number dialed, and associating distinctive tones to an identification of the caller.

13. The method of claim 8, further comprising at least one of:

routing calls based on a physical location of the communications device, and routing calls based on one of a day and a time.

14. A non-transitory computer-readable media comprising computer-executable instructions that, when executed, perform a method comprising:

receiving a first detection signal associated with a first network, wherein the first detection signal is generated in response to a communication device coming into proximity to the first network;

generating a first presence signal associated with the first network, wherein the first presence signal varies in response to a condition of a first connection between the communication device and the first network;

evaluating the first presence signal to assess whether the condition of the first connection permits ongoing communication on the first network;

if it is determined that the condition of the first connection permits ongoing communication on the first network, and in response to one of an incoming call and a message sent to a number associated with another device, other than a primary number of the communications device, forwarding the call or message to the primary number of the communications device; and if it is determined that the condition of the first connection does not permit ongoing communication on the first network, initiating hand over to a second network.

15. A system, for handling simultaneous ringing, comprising:

a first network interface module configured to receive a first detection signal associated with a first network, wherein the first detection signal is generated by the first network in response to a communications device coming into proximity to the first network;

a first presence interface module configured to generate a first presence signal associated with the first network, wherein the first presence signal varies in response to a condition of a first connection between the communications device and the first network, and send the first present signal to a network selection module; and the network selection module being configured to evaluate the first presence signal to assess whether the condition of the first connection permits ongoing communication on the first network;

the first network being configured to provide simultaneous rings to:
 the primary number associated with the communication device; and
 the identified number associated with the other communications device, if the network selection module determines that the condition of the first connection permits ongoing communication on the first network, and in response to one of an incoming call and a message sent to a number selected from a group of numbers consisting of (i) a primary number associated with the communications device and (ii) an identified number associated with an other communications device; and the first network being configured to initiate hand over to a second network, if the network selection module determines that the condition of the first connection does not permit ongoing communication on the first network.

16. The system of claim 15, further comprising:

a second network interface module configured to receive at least a second detection signal associated with the second network, wherein the second detection signal is generated in response to the communications device coming into proximity of the second network;

a second presence interface module configured to generate a second presence signal associated with the second network, wherein the second presence signal varies in response to a condition of a second connection between the communications device and the second network; and the second network being configured to provide simultaneous rings to:
 the primary number associated with the communications device; and
 the identified number associated with the other communications device.

17. The non-transitory computer-readable media of claim 7, wherein, in the method performed by execution of the computer-executable instructions, providing the simultaneous rings to the primary number associated with the communications device and to the identified number associated with the other communications device comprises providing the simultaneous rings to the primary number with at least one of distinctive ring functions, tones, audible notifications, and visual indications.

18. The system of claim 15, wherein the first network, in being configured to provide the simultaneous rings to the primary number associated with the communications device and to the identified number associated with the other communications device, is configured to provide the simultaneous rings to the primary number with at least one of distinctive ring functions, tones, audible notifications, and visual indications.

19. The non-transitory computer-readable media of claim 7, wherein the method performed by execution of the computer-executable instructions further includes at least one of:
    routing calls based on a physical location of the communications device, and
    routing calls based on one of a day and a time.

* * * * *